United States Patent

Kumakura et al.

[11] Patent Number: 6,062,998
[45] Date of Patent: May 16, 2000

[54] SHOE FOR GUIDING THE RUNNING OF A TRANSMISSION CHAIN

[75] Inventors: Atsushi Kumakura, Tokorozawa; Tatsuya Konishi, Hanno, both of Japan

[73] Assignee: Tsubakimoto Chain Co., Osaka, Japan

[21] Appl. No.: 09/123,382

[22] Filed: Jul. 27, 1998

[30] Foreign Application Priority Data

Jul. 28, 1997 [JP] Japan ................. 201881/1997

[51] Int. Cl.$^7$ .................................................. F16H 7/08
[52] U.S. Cl. .......................................... 474/111; 474/110
[58] Field of Search .................... 474/101, 111, 474/140, 135, 109

[56] References Cited

U.S. PATENT DOCUMENTS

| | | | |
|---|---|---|---|
| 4,832,664 | 5/1989 | Groger et al. . | |
| 5,045,032 | 9/1991 | Suzuki et al. . | |
| 5,184,983 | 2/1993 | Shimaya et al. | 474/111 |
| 5,318,482 | 6/1994 | Sato et al. | 474/140 X |
| 5,665,019 | 9/1997 | Sheffer et al. | 474/111 |
| 5,720,682 | 2/1998 | Tada | 474/140 X |
| 5,779,582 | 7/1998 | Mott et al. | 474/140 |

FOREIGN PATENT DOCUMENTS

| | | |
|---|---|---|
| 2254904 | 10/1992 | United Kingdom . |
| 2261276 | 5/1993 | United Kingdom . |
| 2320546 | 6/1998 | United Kingdom . |

*Primary Examiner*—David A. Bucci
*Assistant Examiner*—Marcus Charles
*Attorney, Agent, or Firm*—Dann, Dorfman, Herrell & Skillman, P.C.; Henry H. Skillman

[57] ABSTRACT

A shoe formed to relieve a sliding frictional resistance between a shoe for guiding the running of a transmission chain and the transmission chain, the cross-sectional shape of an incoming end and an outgoing end of a shoe (11) (11') for guiding a transmission chain is formed from a flat pressing-contact surface (12) for slidably guiding bottoms of all transmission chain plates. The flat surface extends longitudinally a short distance and transversely. The cross-sectional shape of an intermediate section between the incoming end and said outgoing end is formed with a convex pressing-contact surface (13A), (13B) for slidably guiding an bottom of less than all of the transmission chain plates, and has a transverse cross-section in which the pressing-contact surface or surfaces does not extend across the full width of the shoe to provide a recess for lubricant, and provide pressing-contact with less than all of the transmission chain plates.

8 Claims, 4 Drawing Sheets

6,062,998

SHOE FOR GUIDING THE RUNNING OF A TRANSMISSION CHAIN

FIELD OF THE INVENTION

The present invention relates to a shoe used for retaining the tension in and guiding the sliding movement of a running transmission chain and is particularly applicable to an endless roller chain, silent chain, or the like stretched between sprockets provided on a crank shaft and a cam shaft, respectively, within an engine compartment.

BACKGROUND OF THE INVENTION

In the past, the cross-sectional shapes of a tensioner shoe for properly retaining the tension of a transmission chain, and a shoe for guiding the running of a transmission chain or the like have substantially the same cross-sectional shape over the full length in a longitudinal direction. For example, for a roller chain, as shown in FIG. 7, the chain has pairs of outer link plates L1 and inner link plates L2 spaced apart by rollers R which pivotally interconnect the link plates, enabling flexure of the transmission chain transversely to its direction of movement to enable the chain to be trained around sprockets, pulleys and the like. The bottoms of all of the outer link plates L1, L1 and inner link plates L2, L2 (the outer link plates and the inner link plates being hereinafter generally called chain plates) of the roller chain are slidably moved in pressing contact over the full length of a shoe S in a longitudinal direction for guiding the running. For a silent chain, the chain has outer guide plates GL spaced apart by a plurality of link plates L. The link plates are pivotally interconnected to enable the chain to be trained around pulleys. In the silent chain, as shown in FIG. 8, the bottoms of the pair of guide plates GL, GL and all of the plurality of link plates L (the pair of guide plates and the plurality of link plates being hereinafter generally called chain plates) are slidably moved in pressing contact over the full length of a shoe S in a longitudinal direction for guiding the running.

Note that the shoe S for guiding the running is mounted on a shoe mounting member G such as a tensioner, a guide member or the like to retain its shape.

The chain first engages the shoe at its incoming end and disengages the shoe at its outgoing end. In the aforementioned prior art, since the bottoms of all the chain plates of the transmission chain are slidably moved in pressing contact over the full length in a longitudinal direction of the shoe for guiding the running, there poses a disadvantage in that running frictional resistance between the transmission chain and the shoe for guiding the running increases.

SUMMARY OF THE INVENTION

The present invention has solved the aforementioned problem by providing a shoe for guiding the running of a transmission chain wherein a cross-sectional shape of an incoming end and an outgoing end of a transmission chain is formed from a flat pressing-contact full-width surface for slidably guiding bottoms of all transmission chain plates, and a cross-sectional shape of an intermediate section between said incoming end and said outgoing end forms a convex pressing-contact rib surface or surfaces for slidably guiding a bottom of less than all of the transmission chain plates, said flat pressing-contact surfaces merging with said convex pressing-contact surface or surfaces continuously.

The guiding of the running transmission chain at the incoming end and the outgoing end causes great surface pressure by the tension of the transmission chain. Because of the flat pressing-contact surface, the incoming and outgoing ends thereby disperse the surface pressure. The intermediate section of the transmission chain is guided in travelling by the bottoms of less than all of the chain plates at the convex pressing-contact surface to thereby reduce the running frictional resistance caused by the reduction in sliding area.

BRIEF DESCRIPTION OF THE DRAWINGS

All of the objects of the present invention are more fully set forth hereinafter with reference to the accompanying dawings, wherein.

DESCRIPTION OF THE PREFERRED EMBODIMENT

Figure 1:
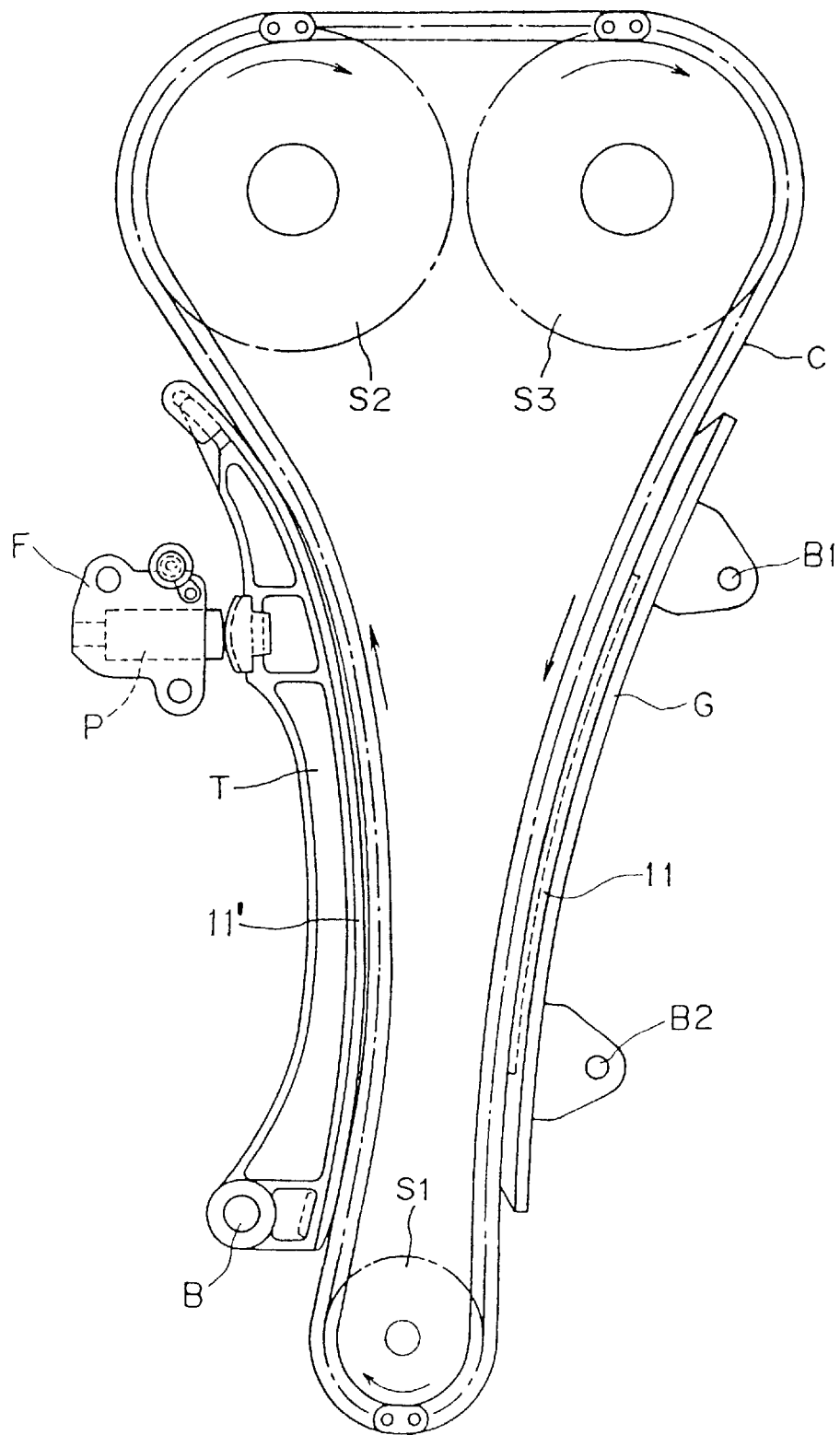
FIG. 1 is a front view of a transmission incorporating embodiments of the present invention.

FIG. 1 illustrates a transmission having an endless roller chain C as a timing chain stretched between a driving sprocket S1 mounted on a crank shaft and a pair of driven sprockets S2, S3 mounted on cam shafts within an engine compartment. The roller chain C runs in a direction indicated by arrows, and a tensioner T for guiding the running while properly retaining the tension of the roller chain and a guide member G for guiding the running of the roller chain are placed in pressing contact with the bottom of the roller chain.

Shoes 11 and 11' for guiding the running according to the present invention are mounted to provide pressing-contact surfaces on the guide member G and the tensioner T respectively.

Figure 2:
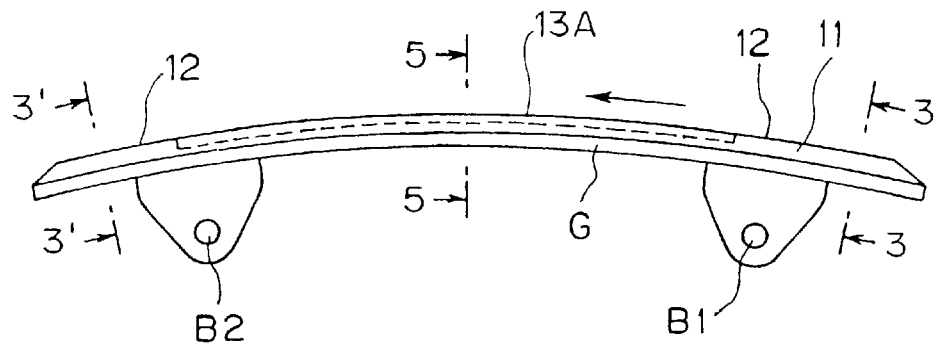
FIG. 2 is a front view of a shoe for guiding the running of a chain according to the present invention.

The tensioner T is mounted for oscillation in the engine compartment (not shown) by a mounting shaft B, and is pressed and urged by a plunger P within a housing secured to the engine compartment by means of a mounting member F. The guide member G is secured to the engine compartment by mounting shafts B1 and B2. The roller chain C runs and comes in a direction as indicated by arrows in FIGS. 1 and 2.

Figure 3:
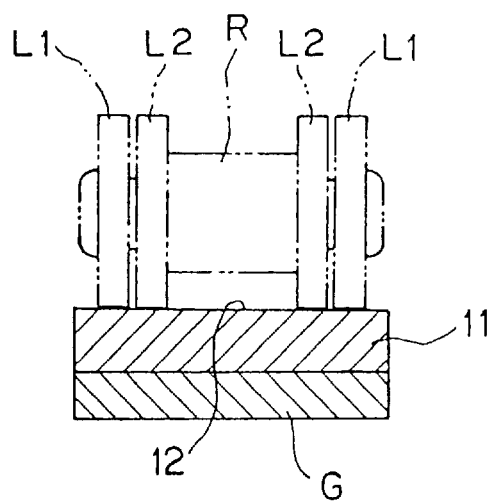
FIG. 3 is a sectional view showing the cross-section of the shoe taken on line 3—3 of FIG. 2, the cross-section being identical to the cross-section taken on line 3'—3'.

The cross-sectional shape of the chain incoming end and the outgoing end of the shoe 11 for guiding the chain running is formed from a flat pressingcontact surface 12 for slidably guiding all the inner and outer chain plates L1, L2 of the roller chain C, as shown in FIG. 3. The flat pressing-contact surface 12 is flat both longitudinally and transversely of the shoe, and is full-width to slidably guide the bottoms of all the chain plates, as shown in FIG. 3, even if a silent chain is used in place of the roller chain C.

Figure 5A:
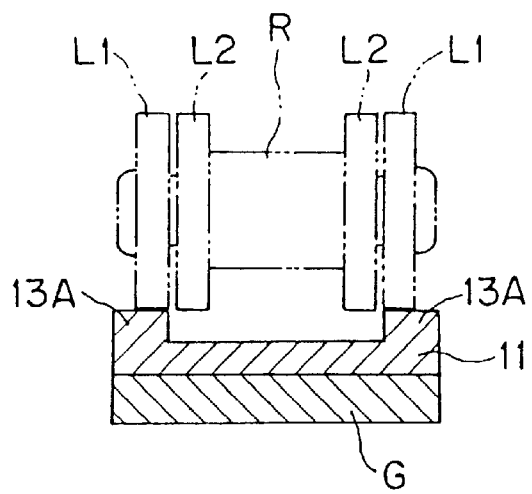
FIG. 5(A) is a sectional view taken on line 5—5 of FIG. 2 showing a cross-section in use with a roller chain.
Figure 5B:
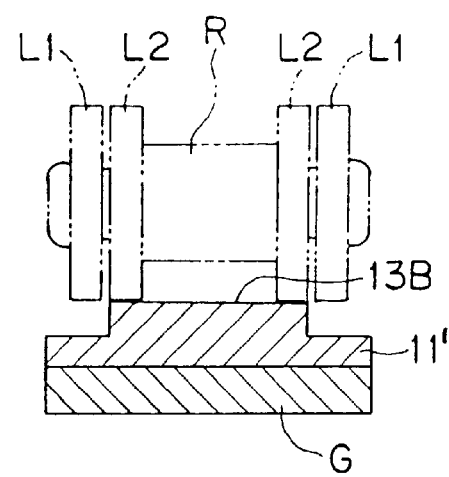
FIG. 5(B) is a similar view showing an alternate embodiment of the cross-section.
Figure 6A:
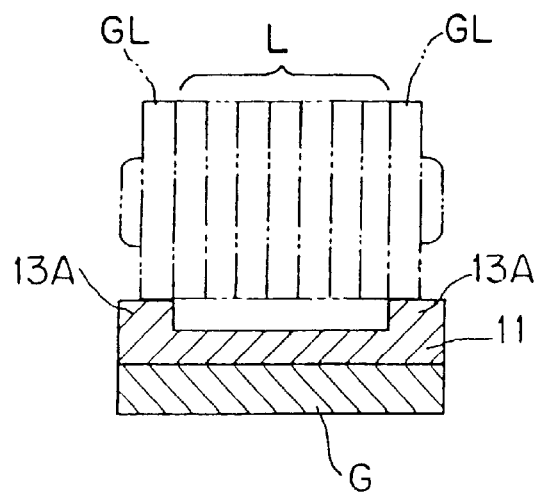
FIG. 6(A) is a sectional view similar to FIG. 5(A) showing the cross-section in use with a silent chain.
Figure 6B:
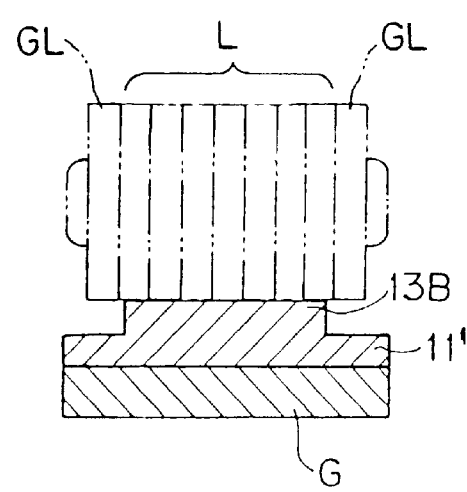
FIG. 6(B) is a sectional view similar to FIG. 5(B) showing the alternate cross-section in use with a silent chain.
Figure 7:
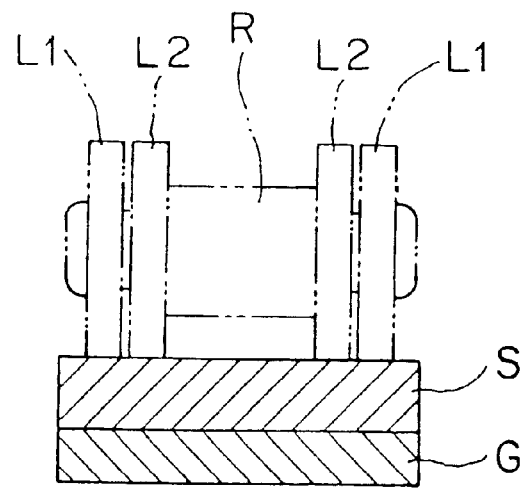
FIG. 7 is a cross sectional view of a conventional shoe for guiding the running of a roller chain.
Figure 8:
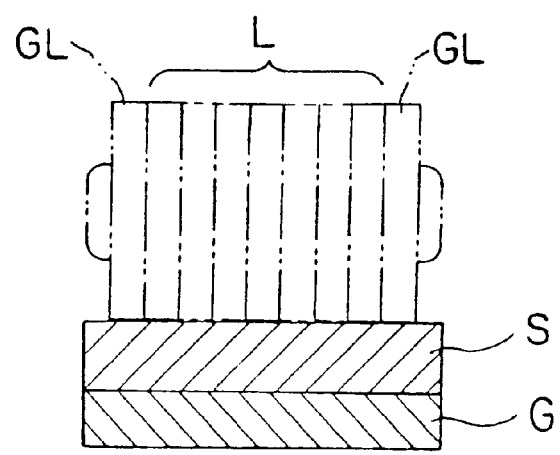
FIG. 8 is a cross-sectional view of a conventional shoe for guiding the running of a silent chain.

As shown in FIG. 5(A), there is formed a convex pressing-contact rib surface 13A for slidably guiding only the bottoms of the outer chain plate Li which is less than all of the chain plates of the roller chain C. An alternate form is shown in FIG. 5(B), in which is formed a convex pressing-contact rib surface 13(B) for slidably guiding the bottoms of only the inner chain plates L2 of the roller chain C. When used with a silent chain as shown in FIG. 6(A), the convex pressing-contact rib surfaces 13(A) slidably guide only the outer chain plates of the silent chain, that is, the bottom of the guide plates GL. As shown in FIG. 6(B), the convex pressing-contact rib surface 13(B) slidably guides only the inner chain plates, that is, the bottom of the intermediate chain link plates L. In the case of FIG. 6(A), the convex pressing-contact rib surface 13(A) may slidably guide the guide plate GL and the bottom of less than all of the chain link plates L, and in the case of FIG. 6(B), the convex pressing-contact surface 13(B) may slidably guide the bottom of less than all of the chain link plates L.

The flat pressing contact full-width surface 12 and the convex pressing-contact rib surfaces 13(A), 13(B) merge as a continuous surface.

Accordingly, since the cross-sectional shape of the shoe 11 for guiding the running is small in sliding area relative to the bottom of the chain plate in the intermediate section as compared with that on the incoming end and the outgoing end of the chain, the running resistance of the chain is smaller than that on the incoming end and on the outgoing end.

Figure 4A:
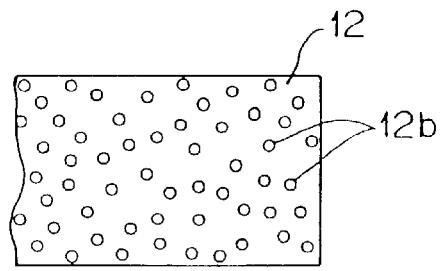
FIGS. 4(A) and (4B) are respectively fragmentary plan views of different embodiments of the incoming and outgoing ends of the shoe.
Figure 4B:
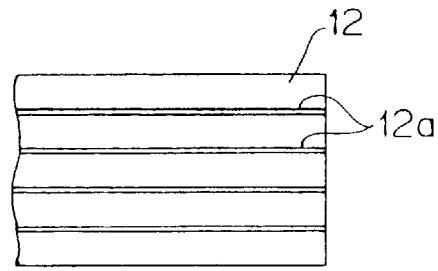

Further, since the shoe 11 for guiding the running on the incoming end and on the outgoing end of the chain is formed with the flat pressing-contact full-width surface, the great surface pressure caused by the tension or the vibration of the chain can be dispersed and borne while the bottoms of all the chain plates are slidably moved. Therefore, the provision of the smooth surface shown in FIG. 3, free from concavo-convex, unavoidably increases the frictional resistance. Accordingly, it is possible to suppress an increase in frictional resistance by providing lubricating-oil-retaining recesses for forming an oil film on the flat pressing-contact surface, for example, a series of slits 12A shown in FIG. 4(A), a plurality of dimples 12B shown in FIG. 4(B) or the like. The slits 12A may be provided not only in the same direction but also perpendicularly or obliquely from each other.

In the present invention, for relieving the sliding friction between the shoe for guiding the running of the chain of the chain tensioner and the shoe for guiding the running of the chain of the chain guide member, and the chain, the cross-sectional shape of the intermediate section between the chain incoming end and outgoing end of the chain guide shoe is formed into one or more convex pressing-contact ribs having a surface for slidably guiding the bottom of less than all of the chain plates and the flat pressing-contact full-width surface for slidably guiding the bottoms of all the chain plates merely on the chain incoming end and outgoing end. Therefore, it is possible to reduce the sliding area between the bottom of the chain plate and the shoe for guiding the running of the chain in the intermediate section formed with the convex pressing-contact rib surface or surfaces to considerably relieve the frictional resistance as compared with the conventional case where the flat pressing-contact full-width surface is formed over the full length of the shoe for guiding the running of the chain.

The cross-sectional shape of the shoe for guiding the running of the incoming end and the outgoing end of the chain is formed into the flat pressing-contact full-width surface whereby the running surface pressure of the chain caused by the tension of the chain and the vibration of the chain can be dispersed and uniformly borne, thus enabling the reduction in surface pressure per unit area of the flat pressing-contact surface to thereby suppress abrasion.

Further, the lubricating oil retaining recesses such as slits, dimples or the like are provided on the flat pressing-contact surface to thereby further enhance the abrasion suppressing effect.

The intermediate section of the shoe for guiding the running of the chain is formed with the convex pressing-contact rib surface whereby one or more recesses appear in the upper surface of the shoe, said recesses functioning as further oil passages to enable further enhancement of the lubricity between the bottom of the chain plate and the convex pressing contact surface or surfaces of the shoe.

While a particular embodiment of the invention has been herein illustrated and described, it is not intended to limit the invention to such disclosures, but changes and modifications may be made therein and thereto within the scope of the following claims.

We claim:

1. A shoe for guiding a running transmission chain formed by a plurality of more than two parallel link plates pivotally interconnected in face-to-face relation, said plates having faces with tops and bottoms forming the top and bottom of the chain respectfully, two of said more than two link plates being outer plates, said shoe comprising:

an incoming end at which the transmission chain is adapted to come into engagement with said shoe, an outgoing end opposite to said incoming end and at which the transmission chain is adapted to pass out of engagement with said shoe, and an intermediate section extending between said incoming end and said outgoing end;

said incoming end and said outgoing end of said shoe each having a flat pressing-contact surface for slidably engaging and guiding the bottoms of all of said plurality of more than two parallel link plates of the transmission chain; and said intermediate section between said incoming end and said outgoing end being partly recessed throughout the length thereof to form a convex pressing-contact surface for slidably engaging and guiding the bottom of at least one, but less than all of said plurality of more than two parallel link plates of the transmission chain, said flat pressing-contact surface and said convex pressing-contact surface merging as a continuous surface.

2. The shoe for guiding the running of a transmission chain according to claim 1, wherein the flat pressing-contact surface is formed with at least one oil-film-forming recess.

3. A shoe according to claim 1 wherein said convex pressing-contact surface is elevated above the flat pressing-contact surface whereby said continuous merging surface raises the bottom of the chain above the flat pressing-contact surface and suspends the bottom of each link plate of said plurality of more than two parallel link plates which is not engaged and guided by said convex pressing-contact surface.

4. A shoe according to claim 2 wherein said flat pressing-contact surface has a series of slits, each forming an oil-film-forming recess.

5. A shoe according to claim 2 wherein said flat pressing-contact surface has a plurality of dimples, each forming an oil-film-forming recess.

6. A shoe for guiding a running transmission chain having a width formed by a plurality of more than two parallel link plates pivotally interconnected in face-to-face relation, said plates having faces with tops and bottoms forming the top and bottom of the chain respectively, two of said plurality of more than two parallel link plates being outer link plates, said shoe having a guide surface with an incoming end and an outgoing end, each with a width at least as wide as said transmission chain width, said guide surface being adapted to confront and engage the bottoms of all of said plurality of more than two parallel link plates, said incoming end being positioned to cause the chain to come into engagement with said guide surface at said incoming end and said outgoing end being positioned to cause the chain to pass out of engagement with said guide surface at said outgoing end, said shoe having at least one rib extending along the length of said guide surface between said incoming and outgoing ends, said rib providing a rib guide surface having a width less than the full width of the transmission chain and positioned on said guide surface to engage the bottom of at least one but less than all of said plurality of more than two parallel link plates.

7. A shoe according to claim 6 wherein said guide surface has two edges and has two ribs, at least one of said two ribs extending along one of said two edges of said guide surface and the other rib extending along the other of said two edges of said guide surface, said ribs each having a width adapted to engage the bottom of one of said outer link plates and not to engage the remaining link plates of said plurality of more than two parallel link plates.

8. A shoe according to claim 6 wherein said at least one rib extending along said guide surface between said incoming and outgoing ends has a width positioned and dimensioned to avoid engagement with either of said outer link plates.

* * * * *

UNITED STATES PATENT AND TRADEMARK OFFICE
CERTIFICATE OF CORRECTION

PATENT NO. : 6,062,998

DATED : May 16, 2000

INVENTOR : Kumakura et al.

It is certified that errors appear in the above-identified patent and that said Letters Patent is hereby corrected as shown below:

Column 2, line 64, "pressingcontact" should be --pressing-contact--;

Column 3, line 6, change "Li" to --L1--.

Signed and Sealed this

Sixth Day of March, 2001

Attest:

NICHOLAS P. GODICI

*Attesting Officer*   *Acting Director of the United States Patent and Trademark Office*